United States Patent

[11] 3,613,750

| [72] | Inventor | William H. Bricknell |
| | | Fort William, Ontario, Canada |
| [21] | Appl. No. | 859,409 |
| [22] | Filed | Sept. 19, 1969 |
| [45] | Patented | Oct. 19, 1971 |
| [73] | Assignee | Hawker Siddeley Canada Ltd. |
| [32] | Priority | July 17, 1969 |
| [33] | | Canada |
| [31] | | 057254 |

[54] GRAPPLE ATTACHMENT FOR TREE PROCESSORS
5 Claims, 4 Drawing Figs.

[52] U.S. Cl............................................. 144/3 D
[51] Int. Cl............................................. A01g 23/02
[50] Field of Search................................ 144/2 N, 3 D, 34 R, 34 E, 309 AC, 312; 143/32 N, 43 N, 68 H

[56] References Cited
UNITED STATES PATENTS

| 3,236,274 | 2/1966 | Eynon............................ | 144/312 R |
| 3,254,686 | 6/1966 | Boyd et al...................... | 144/3 D |
| 3,329,184 | 7/1967 | Longert......................... | 144/3 D |
| 3,398,774 | 8/1968 | Hahn............................. | 144/3 D |

Primary Examiner—Gerald A. Dost
Attorney—Stevens, Davis, Miller & Mosher

ABSTRACT: A grapple attachment for tree processors of the linear type. When the nature of a log is such that the processor operator selects it for a saw log, it is passed through a slashing station until it reaches a substantial length and then is slashed. Instead of being stocked with the normal 8-foot wood, the grapple attachment swings the saw log away from the linear path and releases it.

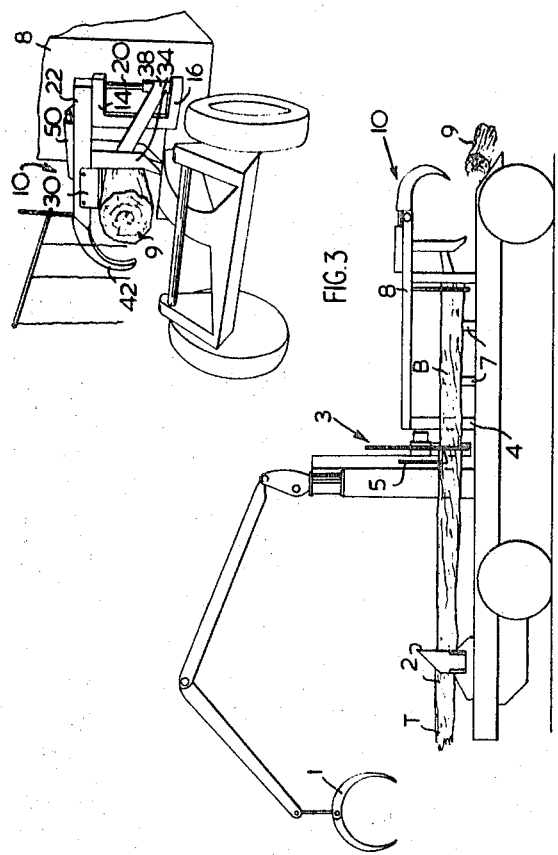

GRAPPLE ATTACHMENT FOR TREE PROCESSORS

This invention relates to tree harvesters of the linear process type and in particular to a grapple arrangement for such a harvester whereby a harvester operator may process logs of a length greater than the standard size pulpwood bolts.

When a processor is working in a pulpwood area, felled trees are debranched and slashed into pulpwood bolts of 8 foot length. Most processors gather the slashed bolts on the machine as an operational step or stack the bolts adjacent to the machine either by placement by grapple tongs or by a kickout operation. However, it often occurs that a felled tree may have a portion that is suitable for future lumber processing (possibly due to diameter), such a portion being referred to as a "saw log." For obvious reasons, saw logs must be longer than a pulpwood bolt, possibly 12, 14 or 16 feet in length. Problems are therefore encountered in stacking or bunching saw logs in with 8 foot bolts as this would require subsequent sorting operations.

The present invention overcomes the above-mentioned difficulties by providing a grapple attachment for linear processors whereby the operator may select saw logs from the pulpwood after the slashing operation and remove them from the linear process path for stacking in an area remote from the pulpwood bolts.

According to one aspect of this invention, there is provided in a timber harvesting device of the type in which a tree is processed along a linear path for slashing into predetermined lengths, means for removing from said path a portion of said tree longer than said predetermined length, comprising a grapple pivotally mounted to said harvesting device to assume (a) a first position in alignment with said linear processing path and in which position said grapple is adapted to receive the tree portion therein; and (b) a second position angularly disposed from said first position and the process linear path and in which position the grapple is adapted to release said tree portion for removal thereof from said path.

The present invention is illustrated by way of example in the accompanying drawings in which:

FIG. 3 is a perspective view of the grapple attached to a linear processor and showing the grapple positioned for receiving a saw log; and FIG. 4 is a side view of the processor showing the grapple angularly positioned with respect to the process path and releasing the saw log.

Figure 1:
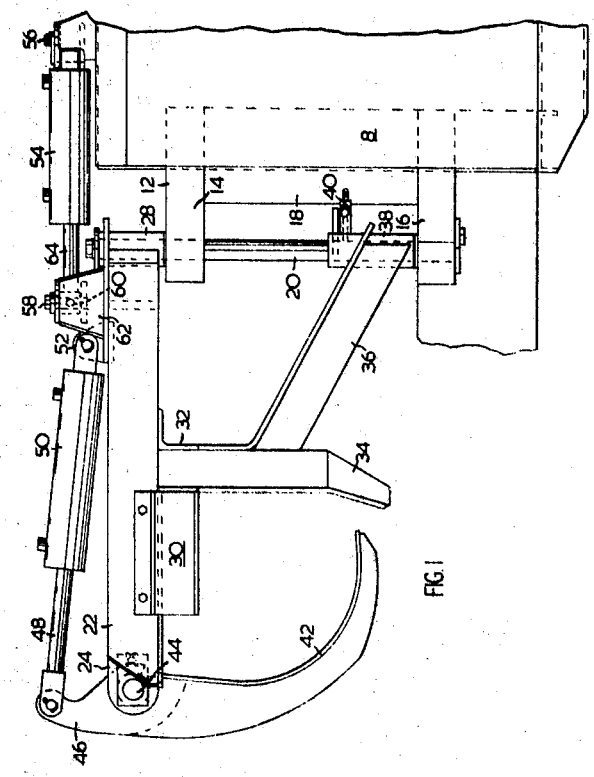
FIG. 1 is a side elevation of the grapple attachment.

The grapple attachment of this invention may be used on various linear processors but as an example it is described in this application in connection with a mobile harvester of the type shown in U.S. Pat. No. 3,398,774 of Aug. 27, 1968 to Raymond M. Hahn. In the Hahn processor, shown schematically in FIG. 4, a felled tree T is placed by a grapple 1 butt end first between pairs of reciprocable debrancher knife clamps 2 which reciprocates toward and away from a slasher 3 along a linear process path 4. Clamps 2 draw the butt end up to a holding member 5 and reciprocate to the rear of the machine as shown in FIG. 4, debranching the tree as it goes. At the end of their stroke, the clamps 4 again grasp the tree and with the holding member 5 released, the tree T is drawn to its FIG. 4 position over kick plates 7. The slashes 3, which may be a guillotine, circular, chain or band saw, then severs the bolt B (normally 8 feet in length) which is then flipped onto the ground or into a pair of catcher arms, not shown, by the kick plates 7.

In linear series with the debrancher clamps 4, slasher 3 and kick plates 7 is a swingable grapple illustrated generally at 10 and pivotally secured to the frame 8 of the processor. When a saw log is selected by the vehicle operator it is brought forward on the linear path 4 until it reaches the desired length for slashing. As it is brought forward, the saw log 9, FIG. 3, passed through the open jaws of the grapple 10. As shown in FIG. 3, chain guides 12 may be utilized for indicating to the operator that the desired cutoff length (say 16 feet) has been reached. The operator then slashes the saw log 9, clamps the jaws of the grapple about the log 9 with the grapple 10 in the FIG. 3 position. The grapple 10 with the log 9 is pivoted to the FIG. 4 position, which is angularly disposed with respect to the linear process path 4, and releases the log so that it is stacked in an area remote from the bolts B so that subsequent sorting operations are avoided.

Figure 2:
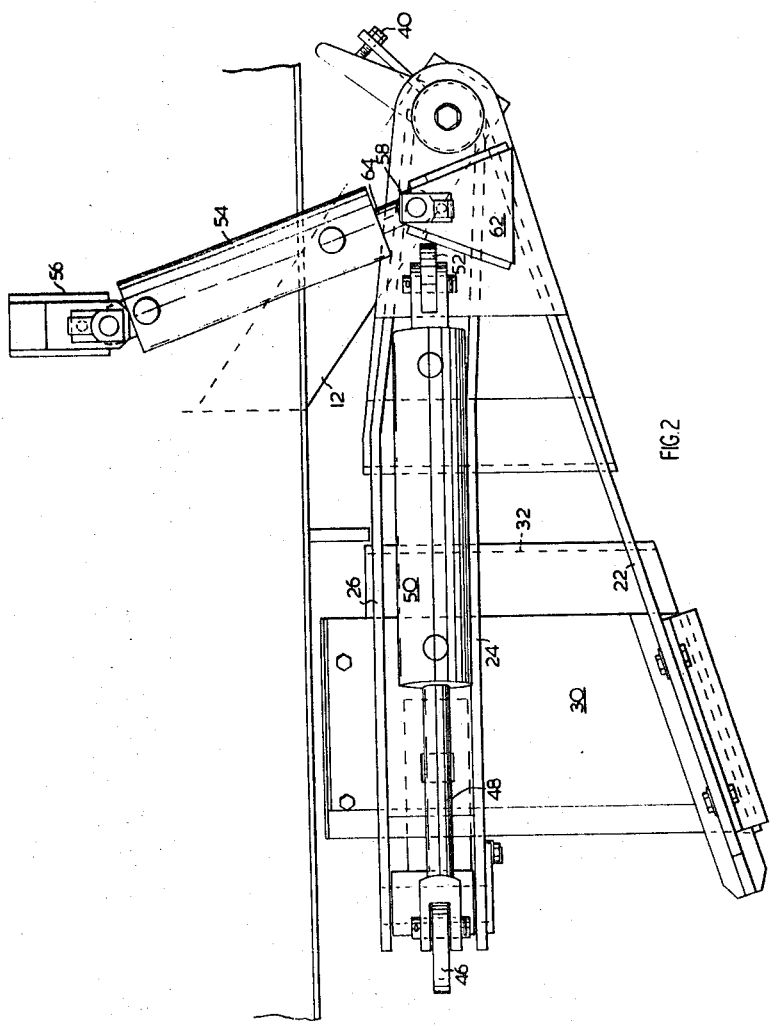
FIG. 2 is a plan view of the attachment shown in FIG. 1.

The grapple attachment 10 is shown in detail in FIGS. 1 and 2. A cradle frame 12 is secured to the frame 8 of the vehicle and includes a pair of horizontally disposed supports 14, 16 which are vertically reinforced by an upright 18. Supports 14 and 16 are drilled to receive a vertically oriented pivot shaft 20 secured therein about which the grapple 10 swings in a horizontal plane from the FIG. 3 to FIG. 4 positions.

The grapple includes upper horizontally disposed arms 22, 24 and 26 which converge toward the shaft 20 to which they are pivotally mounted by a sleeve 28. The outer divergent ends of the arms are secured together by a plate 30 and angle brace 32. A pair of fork legs 34 depend from the arms 22 and 26 and a pair of diagonal braces 36 connects the legs 34 with a sleeve 38 also pivotally mounted on the vertical shaft 20. Sleeve 38 includes an adjustable stop 40.

As show in FIG. 2, arms 24 and 26 are substantially parallel and at their outer ends they support a grapple jaw 42 by a pivotal connection around a pin 44. Jaw 42 has a short arm 46 extending beyond the pivot 44 and arm 46 is pivotally connected to a piston rod 48 of any hydraulic ram 50. The ram 50 is secured at its other end to the converging ends of arms 22, 24 and 26 by a pivot mounting 52. It will be understood from FIG. 2 that actuation of ram 50 will open or close the grapple jaw 42 to grip or release a saw log.

Means for swinging the grapple 10 on the pivot shaft 20 is shown in FIG. 2 in the form of any hydraulic ram 54 pivotally secured at 56 to the vehicle frame and at 58 to the arms 22, 24, 26 adjacent the sleeve 28. Pivot 58 includes a vertical pin 60 secured in a housing 62. The pin 60 being receiving the end of piston 64 of the ram 54.

It will be understood that actuation of ram 54 will swing the complete grapple assembly 10 from the FIG. 3 to FIG. 4 positions or vice versa.

The grapple 10 may be semiautomatic in control so that when the saw log is sheared at the desired length, the operator actuates a control valve which initiates a sequence of operations with (a) the grapple jaw 42 closing on the saw log 9; (b) ram 54 swings the grapple on shaft 20 to the FIG. 4 position; (c) jaw 42 is opened by ram 50 to release log 9 and (d) ram 54 actuates to swing grapple 10 back to its FIG. 3 position to receive another saw log. As the grapple 10 performs these operations, the vehicle operator is free to continue processing the next bolt B.

I claim:

1. In a mobile timber harvesting device of the type in which a tree is processed along a linear path for slashing into predetermined bolt lengths and deposited substantially parallel to said path into catcher arms and including first grapple means for placing said tree in said path and for removing bolts from said catcher arms; the improvement comprising means for removing from said path a selected portion of said tree longer than said predetermined bolt length, comprising a second grapple pivotally mounted to said harvesting device to assume; (a) a first position in alignment with said linear processing path and in which position said second grapple is adapted to receive the tree portion therein; and (b) a second position angularly disposed from said first position and the process linear path and in which position the second grapple is adapted to release said tree portion for removal thereof from said path, said second grapple having a fork member pivotally mounted to the frame of the harvester and a jaw pivotally connected to the fork member.

2. In a mobile tree harvesting device of the type in which a tree is processed along a substantially horizontal linear path through a first station for debranching and a second station for slashing into bolts of predetermined length, for deposition adjacent and parallel to said path and having a first grapple for feeding trees onto said processing path, the improvement comprising a second grapple for removing portions of trees longer than the predetermined length and constituting a third station of the linear path; said second grapple having open and closed positions and being pivotally secured to the frame of the harvesting device; said second grapple having a first operative position in alignment with the linear path beyond the bolt or slashing station and in which position the second grapple is adapted to receive the tree portion therein and a second position angularly disposed from the first position and the process path and in which position the second grapple is adapted to release said tree portion for removal from the path and from the bolts of predetermined length.

3. A saw log attachment for a horizontal linear tree processor having a first grapple for placing severed trees in the processor which debranches and slashes logs into bolts of predetermined length and stacks the bolts adjacent to and parallel to the path after slashing, the saw log attachment being adapted to remove tree portions from the linear process and the area of stack when said portions exceed the predetermined length, said attachment being adapted to be secured to the processor and comprising:

a. a second grapple having a fork defining an opening adapted for alignment with a linear process path;
 b. said fork being adapted for pivotal mounting to a processor so as to be swingable from alignment with the linear path to a position substantially normal to the path;
 c. means for swinging said fork from an alignment position to the substantially normal position;
 d. a grapple jaw pivotally connected to a leg of the second grapple fork and adapted to close upon the opening for gripping a log therein;
 e. and means for opening and closing the grapple jaw.

4. The attachment of claim 3 wherein the means for swinging the fork and opening and closing the jaw are hydraulic rams.

5. The attachment of claim 3 in which the fork is pivoted about a vertical axis; and the angular position is normal to the alignment position.